(12) United States Patent
Visentini et al.

(10) Patent No.: US 9,769,454 B2
(45) Date of Patent: Sep. 19, 2017

(54) METHOD FOR GENERATING A DEPTH MAP, RELATED SYSTEM AND COMPUTER PROGRAM PRODUCT

(71) Applicant: STMicroelectronics S.r.l., Agrate Brianza (IT)

(72) Inventors: Giovanni Visentini, Agrate Brianza (IT); Emiliano Mario Piccinelli, Cavenago Brianza (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 14/672,911

(22) Filed: Mar. 30, 2015

(65) Prior Publication Data

US 2015/0371394 A1 Dec. 24, 2015

(30) Foreign Application Priority Data

Jun. 20, 2014 (IT) ............... TO2014A0493

(51) Int. Cl.
*G06K 7/10* (2006.01)
*G06K 7/14* (2006.01)
*G06K 9/00* (2006.01)
*H04N 13/00* (2006.01)
(Continued)

(52) U.S. Cl.
CPC ..... *H04N 13/0048* (2013.01); *G01B 11/2513* (2013.01); *G06T 7/521* (2017.01); *G06T 2207/10028* (2013.01); *G06T 2207/20021* (2013.01); *H04N 2013/0081* (2013.01)

(58) Field of Classification Search
CPC ........... G06K 7/10722; G06K 7/10851; G06K 9/00154

USPC ..... 235/454; 348/46, 47; 382/107, 209, 106, 382/123
See application file for complete search history.

(56) References Cited

U.S. PATENT DOCUMENTS

| 6,542,249 B1 * | 4/2003 | Kofman ............. G01B 11/2513 356/601 |
| 2005/0145795 A1 | 7/2005 | Wright |

(Continued)

FOREIGN PATENT DOCUMENTS

| DE | 10 2005 037 036 A1 | 4/2007 |
| WO | 2013/184340 | 12/2013 |

OTHER PUBLICATIONS

Pearl, *Probabilistic Reasoning in Intelligent Systems: Networks of Plausible Inference*, Morgan Kaufmann Publishers, Inc., San Mateo, California, 1988, 552 pages.

(Continued)

*Primary Examiner* — Daniel Hess
(74) *Attorney, Agent, or Firm* — Seed IP Law Group LLP (57) ABSTRACT

A pattern of symbols is generated and sent to a projector, wherein the pattern includes an array of symbols having a given number of symbol columns and symbol rows, and an image is obtained from a camera. Next the image is decoded in order to generate a decoded pattern of symbols and the depth map is generated as a function of the pattern and the decoded pattern. The image is decoded by placing an array of classification windows on the image and determining the displacement of each classification window in order to optimize a given cost function. Finally, the decoded pattern is generated by determining a respective symbol for each classification window.

30 Claims, 5 Drawing Sheets

(51) Int. Cl.
*G01B 11/25* (2006.01)
*G06T 7/521* (2017.01)

(56) References Cited

U.S. PATENT DOCUMENTS

| | | | | |
|---|---|---|---|---|
| 2009/0161966 | A1* | 6/2009 | Lim | G06K 9/2036 382/209 |
| 2011/0134225 | A1* | 6/2011 | Saint-Pierre | G01B 11/03 348/47 |
| 2014/0002610 | A1* | 1/2014 | Xi | G01B 11/2513 348/46 |
| 2014/0037146 | A1* | 2/2014 | Taguchi | G01B 11/2509 382/107 |
| 2015/0145959 | A1* | 5/2015 | Tang | G06K 9/00711 348/46 |

OTHER PUBLICATIONS

Albitar et al., "Design of a Monochromatic Pattern for a Robust Structured Light Coding," IEEE International Conference on Image Processing (ICIP 2007), San Antonio, TX, Sep. 16- Oct. 19, 2007, pp. VI-529-VI-532.

Boykov et al., "Fast Approximate Energy Minimization via Graph Cuts," *Pattern Analysis and Machine Intelligence*, pp. 1222-1239, 2011.

Brown, "Decentering Distortion of Lenses," *Photometric Engineering*, pp. 444-462, 1966.

De Bruijn, "Mathematics—A combinatorial problem," *Proc. Koninklijke Nederlandse Akademie* v. *Wetenschappen 49*:758-764, 1946.

Felzenszwalb et al., "Efficient Belief Propagation for Early Vision," *International Journal of Computer Vision 70*(1):41-54, Oct. 2006.

Geng, "DLP-Based Structured Light 3D Imaging Technologies and Applications," *Emerging Digital Micromirror Device Based Systems and Applications III*, Proc. Of SPIE 7932, 2011, 15 pages. I Ito et al., "A Three-Level Checkerboard Pattern (TCP) Projection Method for Curved Surface Measurement," *Pattern Recognition* 28(1):27-40, 1995.

MacWilliams et al., "Pseudo-Random Sequences and Arrays," *Proceedings of the IEEE 64*(12):1715-1729, Dec. 1976.

Maurice et al., "Epipolar Based Structured Light Pattern Design for 3-D Reconstruction of Moving Surfaces," 2011 IEEE International Conference on Robotics and Automation, Shanghai, China, May 9-13, 2011, pp. 5301-5308.

Moreno et al., "Simple, Accurate, and Robust Projector-Camera Calibration," 2012 Second International Conference on 3D Imaging, Modeling, Processing, Visualization and Transmission (3DIMPVT), Zurich, Oct. 13-15, 2012, pp. 464-471.

Ruskey, "Combinatorial Generation," Working Version (1j-CSC 425/520), Department of Computer Science, University of Victoria, Victoria, B.C., Oct. 1, 2003, 311 pages.

Salvi et al., "Pattern codification strategies in structured light systems," *Pattern Recognition 37*:827-849, 2004.

Salvi et al., "A state of the art in structured light patterns for surface profilometry," *Pattern Recognition 43*:2666-2680, 2010.

Zhang et al., "Rapid Shape Acquisition Using Color Structured Light and Multi-pass Dynamic Programming," *Proceedings of the First International Symposium on 3D Data Processing Visualization and Transmission (3DPVT'02)*, 2002, 13 pages.

\* cited by examiner a)     b)     c)     d)

METHOD FOR GENERATING A DEPTH MAP, RELATED SYSTEM AND COMPUTER PROGRAM PRODUCT

BACKGROUND

Technical Field

Embodiments of the present disclosure relate to the estimation of depth maps.

Description of the Related Art

In computer vision a depth map is usually defined as an array of data, which contains information identifying the distance of the surfaces of scene objects from a viewpoint. In particular, during the depth map estimation process, a depth value is associated with each pixel of the depth map. Accordingly, such a depth map may be considered as an image by simply considering the depth values of the depth map as grayscale values of an image.

Various methods exist in the prior art to obtain a depth map, such as e.g.:

stereo imaging, wherein the depth map is estimated from at least two images of the same object obtained from different angels of view; and structured light patterns.

Specifically, the present disclosure relates to the second approach, wherein the scene is illuminated with a structured light pattern.

Figure 1:
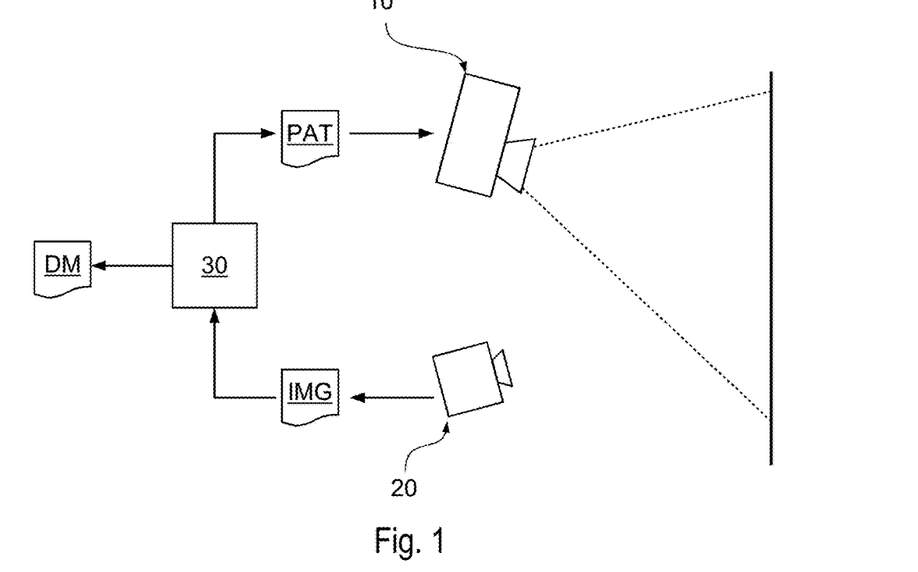
FIG. 1 illustrates an embodiment of a system for estimating depth maps.

For example, as show in FIG. 1, a depth map estimation system operating according to this approach usually comprises a projector 10, a camera 20, and a processing unit 30.

In the example considered, the processing unit 30 sends a given pattern PAT to the projector 10, and the projector illuminates the scene with this pattern.

The camera 20 captures the image IMG of the scene, and thus the pattern PAT projected on the scene, and transmits the image IMG to the processing unit 30.

Finally, by comparing the image IMG with the initial pattern PAT, the processing unit may estimate the depth map DM from the displacement of the patterns in the image IMG.

Generally, the estimation process used to solve this type of problem can be grouped in two families:

multiple shot: in this case the depth information is extracted using several patterns and images; this method can produce excellent quality maps, but is usually only suitable for static scenes;

single shot: where the depth information is extracted using only one single pattern and image; these methods are usually used when it is not possible to acquire more than one image of the same scene, e.g., in presence of moving objects.

For an overview of possible prior-art solutions, reference can be made, e.g., to Maurice X., et al., "*Epipolar Based Structured Light Pattern Design for* 3-*D Reconstruction of Moving Surfaces*", IEEE International Conference on Robotics and Automation, 2011, Shanghai, China; Albitar C., et al., "*Design of Monochromatic Pattern for a Robust Structured Light Coding*", IEEE International Conference on Image Processing, 2007; or Salvi J, et al., "*A State of the Art in Structured Light Patterns for surface profilometry*", Journal in Pattern Recognition, Volume 43 Issue 8, 2010.

BRIEF SUMMARY

In an embodiment, a method for generating a depth map comprises: generating a pattern of symbols to be sent to a projector, wherein said pattern comprises an array of symbols having a given number of symbol columns and symbol rows; obtaining an image from a camera, decoding said image in order to generate a decoded pattern of symbols comprising an array having said given number of symbol columns and symbol rows by: placing an array of classification windows on said image, wherein said array of classification windows has said given number of symbol columns and symbol rows, determining the displacement of each classification window in order to optimize a given cost function, and generating said decoded pattern by determining a respective symbol for each classification window; and generating said depth map as a function of said pattern and said decoded pattern. In an embodiment, said array of symbols is filled with at least one De Bruijn sequences of unique sub-sequences of symbols with a given sub-sequence length. In an embodiment, said array of symbols is filled with at least one De Bruijn sequences of unique sub-sequences of symbols with a given sub-sequence length by repeating the same De Bruijn sequence and adding a variable offset to said Bruijn sequence after given numbers of symbols. In an embodiment, said array of symbols is filled based on an alphabet comprising only two different symbols. In an embodiment, said array of symbols is filled based on an alphabet comprising symbols with the same dimension, wherein the pixels of each symbol having the same grayscale value, and wherein the symbols of said alphabet have respective different greyscale values. In an embodiment, said alphabet comprises only a first and a second symbol, wherein the pixels of said first symbol are all black and the pixels of said second symbol are all white. In an embodiment, the method comprises: subjecting said image obtained from said camera to a binarization filter in order to generate a binarized version of said image and performing said decoding on said binarized version of said image. In an embodiment, said given cost function takes into at least one of: a first cost taking into account whether said displaced classification windows contains valid symbols, and a second cost indicating whether the displaced classification windows have a valid distance with respect to the surrounding classification windows. In an embodiment, said determining a respective symbol for each classification window comprises classifying the symbol in each classification window through an artificial neural network. In an embodiment, said generating said depth map as a function of said pattern and said decoded pattern comprises at least one of: performing a matching operation, wherein said matching operation comprises: determining for each symbol position in said decoded pattern at least one matching symbol position in said pattern; and determining for each symbol position in said pattern at least one matching symbol position in said decoded pattern. In an embodiment, said generating said depth map as a function of said pattern and said decoded pattern comprises determining for each symbol position the distance between said symbol position and the respective at least one matching symbol position.

In an embodiment, a system for generating a depth map comprises a projector, a camera and a processing unit configured for implementing one or more embodiments of a method disclosed herein. In an embodiment, a computer-program product that can be loaded into the memory of at least one processor comprises portions of software code for implementing one or more embodiments of a method disclosed herein.

As used herein, reference to such a computer program product is intended to be equivalent to reference to a computer-readable medium containing instructions for controlling a computer system to coordinate the performance of a method as disclosed herein. Reference to "at least one computer" is evidently intended to highlight the possibility of implementation in a distributed/modular fashion.

As mentioned in the foregoing, the purpose of the present description is to provide techniques for estimating depth maps from an image of the scene illuminated by a predetermined and usually fixed light pattern produced by a projector forming a connected rigid system set-up with an acquiring camera.

In some embodiments, a pattern of symbols is generated and sent to a projector, wherein the pattern comprises an array of symbols having a given number of symbol columns and symbol rows, and an image is obtained from a camera. Next, the image is decoded in order to generate a decoded pattern of symbols comprising an array having the given number of symbol columns and symbol rows and the depth map is generated as a function of the original pattern and the decoded pattern.

For example, in some embodiments, the array of symbols, e.g., the original pattern, is filled with at least one De Bruijn sequences of unique sub-sequences of symbols with a given sub-sequence length. For example, the pattern may be filled by repeating the same De Bruijn sequence and adding a variable offset to the Bruijn sequence after a given numbers of symbols.

In some embodiments, the array of symbols, e.g., the original pattern, is filled based on an alphabet comprising only two different symbols.

In some embodiments, the array of symbols, e.g., the original pattern, is filled based on an alphabet comprising symbols with the same dimension, wherein the pixels of each symbol having the same grayscale value, and wherein the symbols of the alphabet have respective different greyscale values. For example, in some embodiments, the alphabet comprises only a first and a second symbol, wherein the pixels of the first symbol are all black and the pixels of the second symbol are all white.

In some embodiments, for example when black and white symbols are used, the image obtained from the camera may be subjected to a binarization filter in order to generate in binarized version of the image. In this case, the decoding operation may be performed on the binarized version of the image.

In some embodiments, the image is decoded by placing an array of classification windows on the image, wherein the array of classification windows has the given number of symbol columns and symbol rows, and determining the displacement of each classification window in order to optimize a given cost function. In some embodiments, the decoded pattern is then generated by determining a respective symbol for each classification window.

For example, in some embodiments, the cost function may be based on a first cost taking into account whether the displaced classification windows contains valid symbols and/or a second cost indicating whether the displaced classification windows have a valid distance with respect to the surrounding classification windows.

In some embodiments, the symbol for each classification window is determined by classifying the symbol in each classification window through an artificial neural network.

In some embodiments, the depth map is generated by determining for each symbol position in the decoded pattern at least one matching symbol position in the original pattern and/or by determining for each symbol position in the original pattern at least one matching symbol position in the decoded pattern.

For example, in some embodiments, the matching symbol position for a symbol in the original/decoded pattern is determined by selecting a block of symbols centered on the symbol and determining the block of symbols in the decoded/original pattern with the lowest hamming distance.

In an embodiment, a method comprises: generating a pattern of symbols to project, said pattern including an array of symbols having a number of symbol columns and a number of symbol rows; obtaining an image from a camera; decoding said image, generating a decoded pattern of symbols comprising an array having said number of symbol columns and number of symbol rows, the decoding including: defining an array of classification windows of said image, wherein said array of classification windows has said number of symbol columns and number of symbol rows; determining a displacement of each classification window based on a cost function; and generating said decoded pattern by determining a respective symbol for each classification window; and generating a depth map as a function of said pattern of symbols to project and said decoded pattern. In an embodiment, said array of symbols of the pattern of symbols to project is filled with at least one De Bruijn sequence of unique sub-sequences of symbols with a sub-sequence length. In an embodiment, said array of symbols of the pattern of symbols to project is filled with at least one De Bruijn sequence of unique sub-sequences of symbols with a sub-sequence length by repeating the same De Bruijn sequence and adding a variable offset to said Bruijn sequence after one or more threshold numbers of symbols. In an embodiment, said array of symbols of the pattern of symbols to project is filled based on an alphabet comprising only two different symbols. In an embodiment, said array of symbols of the pattern of symbols to project is filled based on an alphabet comprising symbols with the same dimension, pixels of a symbol of the alphabet have a same grayscale value, and each symbol of said alphabet has a respective different pixel greyscale value. In an embodiment, said alphabet comprises only a first and a second symbol, the pixels of said first symbol are all black, and the pixels of said second symbol are all white. In an embodiment, the method comprises: subjecting said image obtained from said camera to a binarization filter in order to generate a binarized version of said image and performing said decoding on said binarized version of said image. In an embodiment, said cost function takes into at least one of: a first cost based on whether displaced classification windows contain valid symbols; and a second cost based on whether displaced classification windows have valid distances with respect to surrounding classification windows. In an embodiment, said determining a respective symbol for each classification window comprises classifying the symbol in each classification window using an artificial neural network. In an embodiment, said generating said depth map as a function of said pattern and said decoded pattern comprises performing a matching operation, the matching operation including at least one of: determining for each symbol position in said decoded pattern at least one matching symbol position in said pattern of symbols to project; and determining for each symbol position in said pattern of symbols to project at least one matching symbol position in said decoded pattern. In an embodiment, said generating said depth map as a function of said pattern of symbols to project and said decoded pattern comprises determining for each symbol position a distance between said symbol position and the respective at least one matching symbol position.

In an embodiment, a device comprises: one or more memories; and image processing circuitry configured to: generate, based on a received image, a decoded pattern of symbols comprising an array having a number of symbol columns and number of symbol rows, the generating including: defining an array of classification windows of said image, said array of classification windows having said number of symbol columns and number of symbol rows; determining a displacement of each classification window based on a cost function; and determining a respective symbol for each classification window; and generate a depth map as a function of a projected pattern of symbols and said decoded pattern, the projected pattern of symbols including an array of symbols having said number of symbol columns and said number of symbol rows. In an embodiment, said array of symbols of the projected pattern includes at least one De Bruijn sequence of unique sub-sequences of symbols with a sub-sequence length. In an embodiment, said array of symbols of the projected pattern includes a repeating of the De Bruijn sequence with a variable offset added to said Bruijn sequence after one or more threshold numbers of symbols. In an embodiment, said array of symbols of the projected pattern is based on an alphabet comprising only two different symbols. In an embodiment, said array of symbols of the projected pattern is based on an alphabet comprising symbols with a same dimension, pixels of a symbol of the alphabet have a same greyscale value, and each symbol of said alphabet has a respective different pixel greyscale value. In an embodiment, said alphabet comprises only a first and a second symbol, the pixels of said first symbol are all black, and the pixels of said second symbol are all white. In an embodiment, the device comprises: a binarization filter configured to filter the received image wherein the decoded pattern of symbols is generated based on the filtered image. In an embodiment, said cost function takes into at least one of: a first cost based on whether displaced classification windows contain valid symbols; and a second cost based on whether displaced classification windows have valid distances with respect to surrounding classification windows. In an embodiment, the image processing circuitry comprises an artificial neural network configured to determine a respective symbol for each classification window. In an embodiment, the image processing circuitry is configured to generate the depth map by, determining for each symbol position in said decoded pattern at least one matching symbol position in said pattern of symbols to project; and determining for each symbol position in said pattern of symbols to project at least one matching symbol position in said decoded pattern. In an embodiment, the image processing circuitry is configured to generate the depth map by determining for each symbol position a distance between said symbol position and the respective at least one matching symbol position.

In an embodiment, a non-transitory computer-readable medium's contents configure a digital image processor to perform a method, the method comprising: generating, based on a received image, a decoded pattern of symbols comprising an array having a number of symbol columns and number of symbol rows, the generating including: defining an array of classification windows of said image, said array of classification windows having said number of symbol columns and number of symbol rows; determining a displacement of each classification window based on a cost function; and determining a respective symbol for each classification window; and generating a depth map as a function of a projected pattern of symbols and said decoded pattern, the projected pattern of symbols including an array of symbols having said number of symbol columns and said number of symbol rows. In an embodiment, the method comprises: projecting the projected pattern of symbols. In an embodiment, said array of symbols of the projected pattern is based on an alphabet comprising symbols with a same dimension, pixels of a symbol of the alphabet have a same grayscale value, and each symbol of said alphabet has a respective different pixel greyscale value. In an embodiment, said alphabet comprises only a first and a second symbol, the pixels of said first symbol are all black, and the pixels of said second symbol are all white.

In an embodiment, a system comprises: a projector to project a pattern of symbols, said pattern including an array of symbols having a number of symbol columns and a number of symbol rows; an image sensor; image processing circuitry configured to: obtain an image from the image sensor; decode said image, generating a decoded pattern of symbols comprising an array having said number of symbol columns and number of symbol rows, the decoding including: defining an array of classification windows of said image, wherein said array of classification windows has said number of symbol columns and number of symbol rows; determining a displacement of each classification window based on a cost function; and generating said decoded pattern by determining a respective symbol for each classification window; and generating a depth map as a function of said projected pattern of symbols and said decoded pattern. In an embodiment, the image processing circuitry comprises an artificial neural network configured to determine a respective symbol for each classification window. In an embodiment, the image processing circuitry comprises a binarization filter configured to filter the received image and is configured to generate the decoded pattern of symbols based on the filtered image.

BRIEF DESCRIPTION OF THE SEVERAL VIEWS OF THE DRAWINGS

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

As mentioned in the forgoing, the instant disclosure relates to solutions for estimating a depth map by projecting a pattern on a scene and by comparing, usually also called "matching", the acquired pattern IMG (being deformed by the scene) with the original pattern PAT. Accordingly, in this type of estimation methods, the pattern PAT used plays an important role, because it should render the matching phase simple and robust. For this purpose, the pattern PAT comprises a sequence of determined symbols.

Generally, as also described with respect to FIG. 1, the system comprises a projector 10, a camera 20 and a processing unit 30.

For example, the projector 10 and the camera 20 may be matched in the visible region or in the infrared light spectrum, which is not visible to human eyes. Moreover, the projector 10 and the camera 20 might have different resolutions: for example, the projector 10 may support VGA resolution (e.g., the resolution of the pattern PAT may be 640×480 pixels), whereas the camera 20 may have a higher resolution (e.g., the resolution of the image IMG may be 1280×720 pixels). For example, in this case, the image IMG may be down-sampled and/or only the area illuminated by the projector may be taken into account.

In some embodiments, the processing unit 30 may be a microprocessor or a personal computer programed via software instructions, a dedicated integrated circuit or a combination of both. For example, the processing could be implemented completely via software or via software accelerated by a GPU or multicore system or finally by a dedicated hardware, which is able to implement the processing operations. Moreover, both hardware and software solutions may introduce different stages of parallelism.

Figure 2:
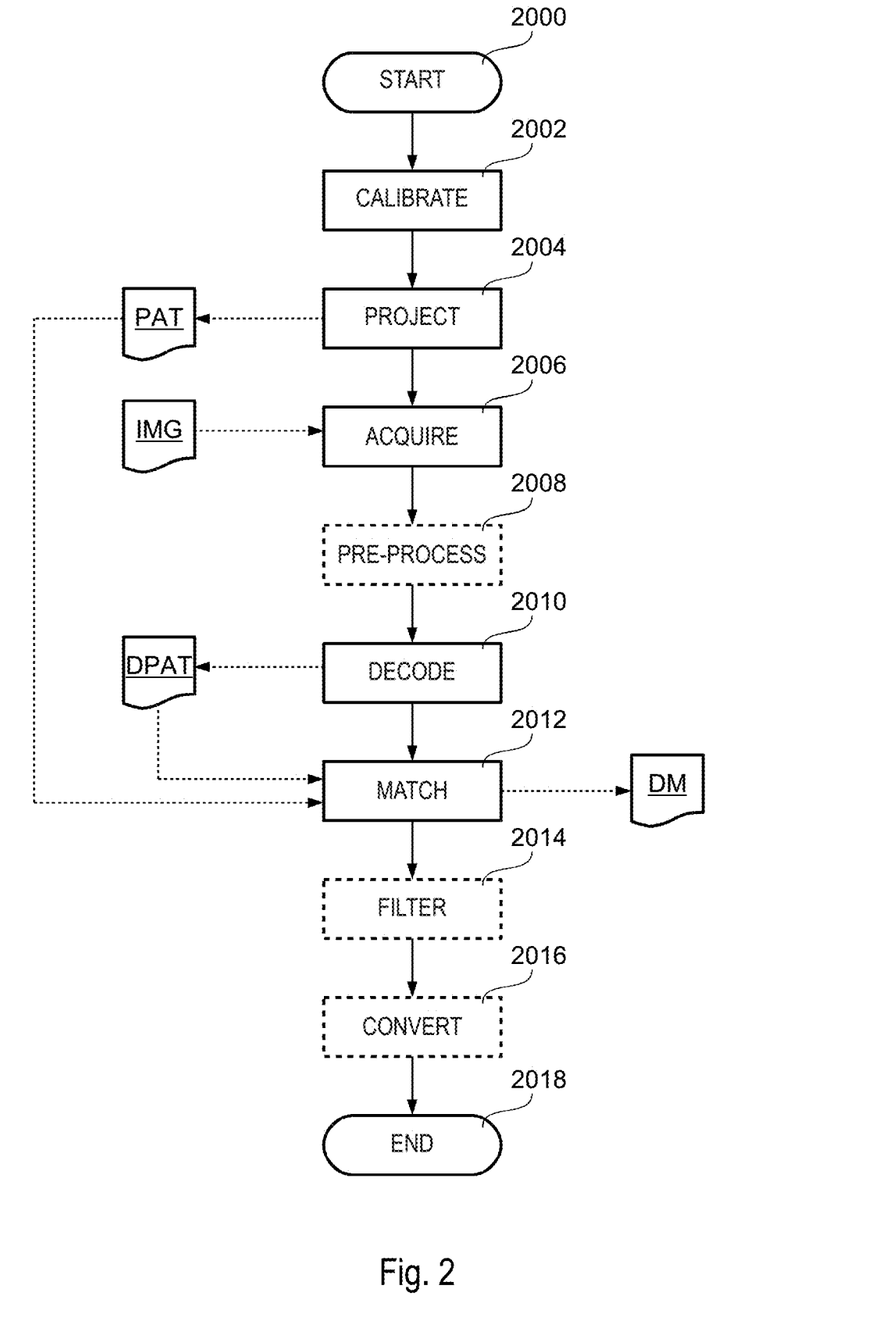
FIG. 2 is a flow-chart showing an embodiment of a method for estimating depth maps in accordance with the present disclosure.

FIG. 2 is a flow chart of an embodiment of a method for generating depth maps in accordance with the present disclosure.

Specifically, after a start step 2000, the method performs in a step 2002 a calibration of the camera, the projector and/or the system. For example, this phase may be used to determine the lens distortions.

In a step 2004, a pattern PAT comprising a plurality of symbols is generated by the processing unit 30 and sent to the projector 10, which projects the pattern PAT on the scene.

In a step 2006, the processing unit 30 acquires at least one image IMG via the camera 20.

In some embodiments, the image acquired IMG is then pre-processed in a step 2008. For example, the step 2008 may include a filtering operation and/or the lens distortion may be removed.

Next, in a step 2010, the image IMG is decoded to retrieve the projected symbols thus producing a decoded pattern DPAT.

In a step 2012, the decoded pattern DPAT is matched against the original pattern PAT to extract the disparity values and generate the depth map DM.

Finally, the method terminates at a stop step 2018.

Generally, the method may also comprise further steps.

For example, in some embodiments, the method comprises a filtering step 2014 in order remove outliers in the depth map and/or to fill unassigned pixels, e.g., holes, in the depth map DM.

The method may also comprise a step 2016, in which the disparity values are converted into distance values.

All this steps are explained in more detail below, in the following sections.

Calibration

As mentioned in the foregoing, the method comprises a setup or calibration phase 2002 adapted to calibrate a system comprising a camera 20 and a projector 10.

Generally, in particular in case the projector and camera are fixed with respect to each other, the calibration may also be performed only once and the respective calibration information may be stored.

Such calibration methods are well known in the art rendering a more detailed description herein superfluous.

For example, in some embodiments, the method described in the document Moreno D., et al., "*Simple, Accurate, and Robust Projector-Camera Calibration*", Second International Conference on 3D Imaging, Modeling, Processing, Visualization & Transmission, 2012, Zurich, Switzerland, may be used, and which is incorporated herein by reference for this purpose.

Substantially, this document proposes to project via the projector 10 a sequence of binary patterns onto a static planar checkerboard and the respective images are acquired via the camera 20. Moreover, this phase is repeated for several checkerboard poses.

Specifically, in order to calibrate the projector 10, an association has to be created between a point of the target, such as a corner point, and a projector pixel. This can be achieved, e.g., by creating a mapping between the camera pixels and the projector pixel, in this way when a corner is found in the camera image, the respective pixel coordinate may be converted in the pixel coordinate inside the projector plane.

For example, if a column of the projector 10 comprises n pixels, then at least $k=\log_2(n)$ different patterns should be projected. For example, in some embodiments, the i-th pattern, with i=1 . . . k, may comprise $2^i$ vertical stripes, wherein black and white stripes are alternated. For example, the first pattern may comprise two vertical stripes, e.g., one black stripe and one white stripe with width n/2, and the last (k-th) pattern comprises $2^k$ vertical stripes, e.g., $2^k/2$ black stripes and $2^k/2$ white stripes with a width of one pixel $(n/2^k)$.

By collecting all these patterns it is possible to reconstruct precisely from which column of the projector 10 the light comes from. Similarly, by repeating the same process for horizontal stripes, it is possible to retrieve the row of the projector that sends light to a given pixel of the camera 20 and at the end it is possible to associate each pixel of the projector 10 to a pixel of the camera 20.

For example, according to above article form Moreno D., the various images may be elaborated through the following steps:

1) to detect checkerboard corner locations for each plane orientation in a completely illuminated images;

2) to estimate global and direct light components for each set using binary code;

3) to decode structured-light patterns into projector row and column correspondences by means of robust pixel classification, considering pixel global and direct components from step 2;

4) to take small image patches centered at the checkerboard corner coordinates from step 1 (e.g., a 47×47 pixels square) and use all the correctly decoded pixels in each patch to compute a local homography that converts from camera to projector coordinates;

5) to translate corner locations (step 1) from camera to projector coordinates using patch local homographies from step 4;

6) to fix a world coordinate system to the checkerboard plane and use Zhang's method to find camera intrinsics using camera corner locations from step 1;

7) to fix a world coordinate system to the checkerboard plane and use Zhang's method to find projector intrinsics using projector corner locations from step 5;

8) to fix camera and projector intrinsics (steps 6 and 7) and use world, camera, and projector corner locations (steps 1 and 5) to estimate stereo extrinsic parameters;

9) Optionally, all the parameters, intrinsic and extrinsic, can be bundle-adjusted together to minimize the total reprojection error.

The above information may be used to build a lookup table that maps camera pixels into projector pixels and vice versa.

Alternatively, (as done by the author of the above paper), the homography may be computed which permits to reach also subpixel precision in the conversion, thus obtaining better results.

Pattern Generation

Next at least one pattern PAT is generated at the step 2004.

The pattern PAT may be structured, such that the depth map DM may be estimated from a single image IMG. Accordingly, the respective depth map estimation methods are usually called "single shot" methods, because one acquired image IMG will be matched with one projected pattern PAT to find the shift between an acquired pixel and the respective original one (disparity).

In an embodiment, the structured light pattern is based on a binary pattern, e.g., black and white pixels, because the method is more robust in case colored objects are used. In fact, in this case the method has to distinguish only between high and low luminance values.

The inventors have observed that repetitive patterns may cause problems in stereo matching, because they can create multiple local minimum, which may result in wrong matching results.

Accordingly, in some embodiments, a new pattern PAT is used which facilitates substantially avoiding such situations.

In an embodiment, a pattern PAT is composed of symbols, wherein each symbol comprises a particular arrangement of black and white pixels.

Accordingly, each symbol corresponds to an array of pixels, which may be either black or white.

In some embodiments, the symbol width and height are the same. Conversely, the dimension usually depends on the camera resolution, the projector resolution, and the desired resolution of the depth map DM. For example, in case the projector 10 supports at least VGA resolution, 4×4 pixel arrays may be used for the symbols.

For example, FIGS. 3a to 3h show examples of different symbols comprising an array of 4×4 pixels, e.g., 4 columns and 4 rows, wherein each pixel may be either black or white.

Experiments performed by the instant applicant showed that there may be problems when decoding the pattern, in particular when the camera resolution is not sufficient high.

Figure 4:
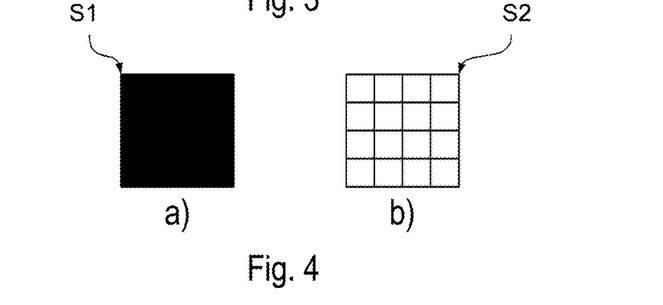

Accordingly, in an embodiment, in order to reduce the risk of false detections of symbols in the image IMG, only two symbols are used. Specifically, as shown in FIGS. 4a and 4b, these two symbols correspond to an array of black pixels and an array of white pixels, e.g., each symbol has a fixed symbol width and symbol height, and the pixels of the symbol are either black or white. For example, considering the exemplary case of a 4×4 pixel array, the first symbol 51 would comprise 4×4 black pixels and the second symbol S2 would comprise 4×4 white pixels.

According to some embodiments, these symbols are used to generate a sequence of unique sub-sequences of symbols, e.g., each sub-sequence of symbols is unique in the sequence.

Specifically, considering sub-sequences consisting of n symbols, whereby the symbols are taken from an alphabet having k symbols, $k^n$ unique sub-sequences of symbols exist.

For example, considering sub-sequences having a length of two symbols, wherein only two symbols S1 and S2 are used, the unique sub-sequences would be:

"S1 S1",
"S1 S2",
"S2 S1", and
"S2 S2".

In some embodiments, these sub-sequences are used to generate a "*De Bruijn sequence*", which is disclose e.g., in De Bruijn N. G., "*A combinatorial problem*", Proc. Koninklijke Nederlandse Akademie v. Wetenschappen 49, 758-764, 1946. Specifically, such a De Bruijn sequence does not comprise a mere sequence of the above sub-sequence, but the final sequence is structure and comprises only $k^n$ symbols.

For example, considering the above sequence, the final sequence could be, e.g., "S1 S1 S2 S2".

For example, considering an alphabet comprising k=2 symbols and sub-sequences comprising n=9 symbols, the De Bruijn sequence would 512 symbols.

For example, considering a projector 10 having a resolution of 640×480 pixels (corresponding to the resolution of the pattern PAT) and symbols with 4×4 pixels, the pattern PAT would comprise 160 (640/4) symbol columns and 120 (480/4) symbol rows, e.g., a total of 19.200 symbols could be projected.

Accordingly, the above sequence would not cover the whole pattern PAT, but the 512 symbols of the sequence would cover only 3 symbol rows.

Moreover, the inventors have noted that by merely repeating the sequence, the pattern would become repetitive after 16 symbol rows. However, in this case, errors may occur during the matching operation if high disparities occur.

Accordingly, in some embodiments, the length k of the sub-sequences could be incremented in order to generate a De Bruijn sequence that covers the whole pattern PAT, e.g., k=15 symbols.

However, the inventors have noted that the final depth map DM becomes less accurate in this case. A possible explanation for this problem may be that it is more likely that symbol sequences are interrupted by depth discontinuities, which may result in a wrong matching of the respective pixels.

Accordingly, in some embodiments, the De Bruijn sequence has a length, such that a plurality of symbol rows in the pattern PAT is covered, e.g., 2 to 20 symbol rows, 3 to 10 symbol rows, etc.

However, as mentioned in the foregoing, this may create repetitive patterns.

In order to avoid this problem, in some embodiments, a random offset is added to the sequences after determined numbers of symbols. For example, in an embodiment a random offset is added at the beginning of each symbol row of the pattern PAT.

Figure 5:
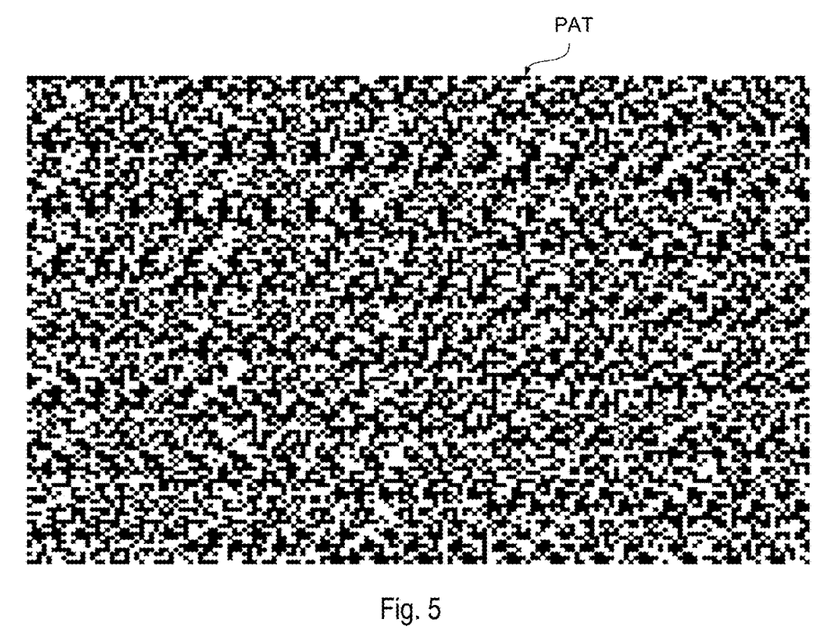

For example, FIG. 5 shows an example of a final pattern PAT with VGA resolution.

Acquisition and Pre-Processing

Once the pattern PAT has been projected on the scene, the processing unit 30 acquires in the step 2006 at least one image IMG via the camera 20.

Next the image acquired IMG may be pre-processed in the step 2008.

For example, in an embodiment, the step 2008 includes a lens distortion compensation operation.

For example, in same embodiments, the well-known Brown's model, see e.g., Brown D.C., "*Decentering distortion of lenses*", Photometric Engineering, 444-462, 1966, may be used for this purpose. According to this model a pixel (x, y) is mapped to the correct position (x', y') with the following equations:

$$x' = x(1 + k_1 r^2 + k_2 r^4 + k_3 r^6) + 2p_1 xy + p_2(r^2 + 2x^2) \quad (1)$$

$$y' = y(1 + k_1 r^2 + k_2 r^4 + k_3 r^6) + p_1(r^2 + 2y^2) + 2p_2 xy \quad (2)$$

where $k_i$ are the radial distortion coefficients, $p_i$ are the tangent distortion coefficients and $r^2 = x^2 + y^2$ is the distance of the pixel (x, y) from the center of the image.

Usually, two lens correction operations may be performed in order to correct the lens of the projector and the lens of the camera. Accordingly, in some embodiments, a pixel of the image IMG is first mapped to a first new position by correcting the lens distortion caused by the lens of the camera 20, and this corrected pixel is then mapped to a second new (final) position by correcting the lens distortion caused by the lens of the projector 10.

Generally, this step is optional, because the lens distortion could be small and/or the correction could also be performed directly within the camera 20 and/or projector 10.

In some embodiments, the step 2008 includes also a filtering step, wherein the acquired color or grayscale image IMG is processed with a contrast enhancement filter.

For example, in an embodiment, the image is converted into a binary, e.g., a black and white, image. In fact, as mentioned in the foregoing, the symbols usually comprise only black and white pixels. Accordingly it is sufficient to perform the decoding operation based on a black and white version of the image IMG.

Generally, any binarization filters may be used for this purpose.

For example, in an embodiment, in order to render the filtering operation substantially independent from the light intensity of the image IMG, an adaptive and/or local threshold filter may be used.

For example in an embodiment, the filter computes the average value for a block of pixels surrounding a given pixel and determines the final value of the pixel (black or white) using the average value as threshold.

Conversely, in an embodiment, two blocks are used: a small block, such as a 4×4 pixel block and a large block, such as an 8×8 pixel block, both centered on the pixel. In this case, the average value of the inner part (e.g., the small block) may be compared with the average value of outer part (e.g., the pixels belonging only to the large block and not the small block), which represents the threshold for the binarization operation. In some embodiments, this filtering operation is repeated for all pixels in the image.

Accordingly, thanks to the averaging operation of the inner block, this operation also filters blurred and defocused areas.

Figure 6A:
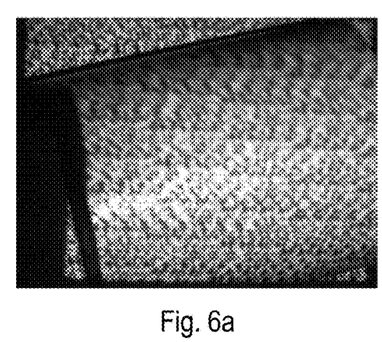
FIGS. 6a, 6b and 9a to 9f illustrate examples of the results of various steps of the method shown in FIG. 2.
Figure 6B:
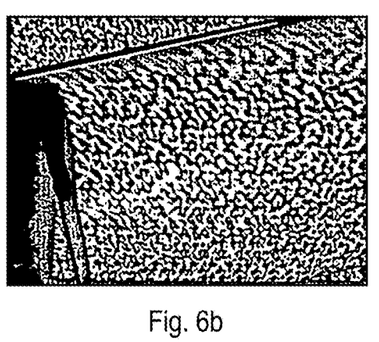

For example, FIGS. 6a and 6b show examples of an original grayscale image and a version filtered by the above mentioned filter.

Again this step is optional, because the camera 20 could also provide already a black and white image IMG.

Pattern Extraction

Next, the pre-processed image IMG is decoded in a step 2010 to retrieve the projected symbols of the pattern PAT.

As mentioned in the foregoing, in some embodiments, only two possible symbols are used: a black square or a white square, or generally a black or white rectangle. Accordingly, the decoding operation has to distinguish only between these two symbols.

However, these symbols are projected on surfaces, which often may not be perpendicular to the camera 20. Accordingly, the symbols may be deformed and correspond often to rhombuses or parallelograms. Moreover, some adjacent symbols may be shifted by discontinuities and part of the symbols may also be occluded. Accordingly, it is not possible, e.g., to merely use a fixed reference grid.

In some embodiments the step 2010 is divided into two operations: the first operation determines the centers of the symbols, and the second operation decides if the symbol is black or white.

Basically, the first step tries to place a classification window in the middle of the symbol.

Generally:

a) the classification window is placed correctly when the pixels in the window have similar values;

b) the distance between adjacent windows, e.g., the respective centers, should be approximately a symbol width or height, which avoids overlaps or gaps between the windows; and c) the disparity values for adjacent windows should be similar.

In some embodiments, the problem may be addressed by setting up a global optimization problem that tries to optimize a cost function.

Basically, the image is divided in a set P of classification windows p. For example, considering the above example of an image IMG with 640×480 pixels, and 4×4 pixel symbols, each row would comprise 160 (640/4) windows and each column would comprise 120 (480/4) windows, e.g., the entire image IMG would comprise a set P of 19,200 windows (e.g., the number of symbols in the pattern PAT).

Generally, the resolution of the IMG can also be higher than the resolution of the pattern PAT.

For example, this might be useful if the image does not only comprise the projected pattern PAT but also surrounding elements. In this case, the image IMG may be cropped only to the area with the pattern.

Moreover, also the decoding operation may be performed on images with a higher or even lower resolution compared to the original pattern PAT. In this case, the area which contains the pattern may still be divided in an array of classification windows, which corresponds to the number of symbols in the pattern, e.g., 160 symbol columns and 120 symbol rows. However, in this case, the classification windows would have a different number of pixels with respect to the original symbols. However, due to the fact, that the symbols correspond only to black or white areas, this does not introduce any problems and the following description could be modified to consider the new dimension of the classification window, for example by replacing the symbol widths and heights with equivalent higher or lower resolution values. Moreover, the image or image portion with the projected pattern may also be down- or up-sampled in order to obtain an image containing only the projected pattern and having the same resolution as the original pattern PAT.

In order to identify the center, the method may assume that the maximum center offset can be only +/−2 pixel in horizontal and vertical direction, because each symbol has 4×4 pixels, e.g., the maximum horizontal and vertical offset is half symbol width and half symbol height, respectively.

Accordingly, in some embodiments, an optimization problem is defined which determine the shift $f_p$ that has to be applied to each window p in order to center the window on a symbol, e.g., a black or white square, in the image IMG.

For example, in an embodiment the following cost function may be used:

$$E(f) = \sum_{p \in P} D_p(f_p) \quad (3)$$

where the sum computes the cost of assigning a respective value $f_p$ to each windows p in the set of windows P, e.g., ***the cost function E(f) returns the cost of assigning a given combination of shifts $f_p$ to the classification windows p in the set P.

Thus by optimizing the cost function E(f), e.g., by minimizing the function, the combination of shifts $f_p$ may be selected, which places the classification windows in the appropriate positions.

For example, assuming that the classification windows and the symbols have a dimension of 4×4 pixel, the shift may be:

$$f_p = [\Delta x, \Delta y] \in [-2,-1,0,1] \times [-2,-1,0,1] \quad (4)$$

Using a minimization approach, the function $D_p(f_p)$ should have a minimum when the center of the respective window p is in the middle of a complete white or black area. Evidently, an opposite behavior would be required when the cost function E(f) should be maximized.

For example, considering that a black pixel has the value 0 and a white pixel has the value 255, which corresponds to the usual coding for grayscale images, a possible solution for the function $D_p(f_p)$ could be based on the following function:

$$D'_p(f_p) = \left| \sum_{q \in N(p)} I(q) - \sum_{q \in N(p)} (255 - I(q)) \right| \quad (5)$$
$$= \left| 255 \cdot |N(p)| - 2 \sum_{q \in N(p)} I(q) \right|$$

where the function I(q) returns the value of a given pixel q belonging to the set of pixel N(p) which correspond to the pixels of the classification window p shifted by $f_p$.

In this case, if all pixels are black (with I(q)=0) or white (with I(q)=255), the function $D'_p(f_p)$ will return the value 255·|N(p)|. For example, in the case of a 4×4 pixel classification windows, the function would return 4.080 (255×4×4). Conversely, for other values, the function will return lower values, reaching 0, when the average value of all pixels is gray (with I(q)=127).

Due to the fact, that the function has an opposite behavior, the final function could be, e.g., $$D_p(f_p) = -D'_p(f_p) \quad (6)$$

Figure 7:
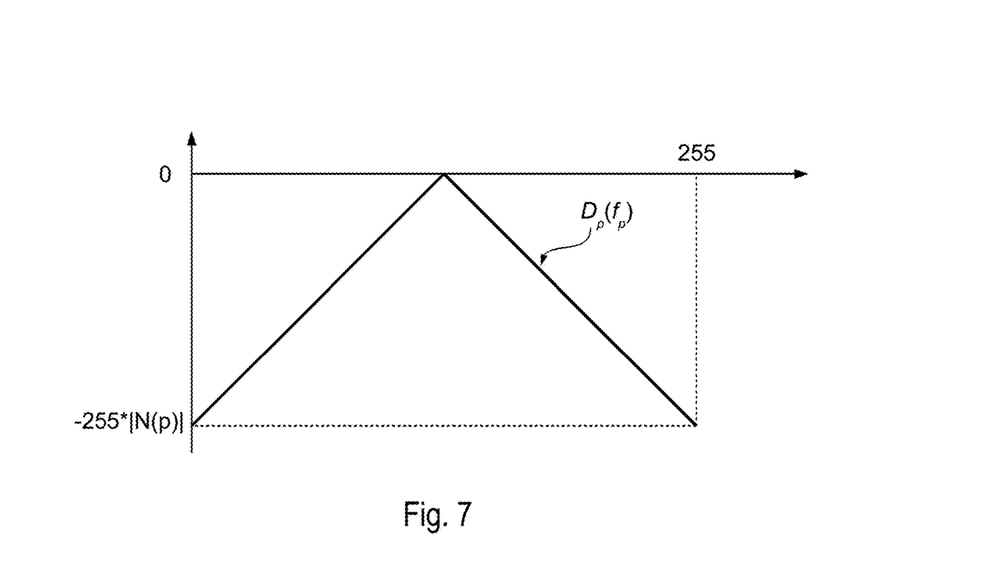
FIGS. 7 and 8 shows details of the decoding of a pattern in accordance with the present disclosure.

For example, FIG. 7 shows a chart showing the respective result of the function $D_p(f_p)$ in relation to the average values of the pixels in a classification windows p.

Accordingly, the sum of the cost function $D_p(f_p)$ determines a cost indicating whether the displaced classification windows p contain valid symbols, e.g., the sum has a minimum when the majority of classification windows p contain valid symbols.

Evidently, the same functions could also be adapted in case a different coding is used, e.g., in case a black pixel has the value 0 and a white pixel has the value 1.

In an embodiment, the above equation (3) is modified in order to improve smoothness and penalize large differences between neighbor pixels:

$$E(f) = \sum_{p \in P} D_p(f_p) + \sum_{(p,q) \in N} V_{pq}(f_p, f_q) \quad (7)$$

Specifically, the second function computes the cost of assigning the shift $f_p$ to a given window p, and a respective shift $f_q$ to each neighbor window q.

Basically, this modification is based on the assumption that the majority of classification windows should have a horizontal and vertical distance of 4 pixels, or generally the width and height of the symbols in the pattern PAT.

Accordingly, the sum of the cost function $V_{pq}$ determines a cost indicating whether the displaced classification windows p have a valid distance with respect to the surrounding classification windows, e.g., one symbol height or width.

In some embodiments, only the neighbor windows q are selected which have a side in common with the window p, e.g., the set N comprises for each symbol p only four surrounding neighbor windows q.

For example, taking the window p and one of the neighbor windows q, the windows p would have an original center $c_p$ and a shift $f_p$, and the windows q would have an original center $c_q$ and a shift $f_q$:

$$c_p = [x_p, y_p], f_p = [\Delta x_p, \Delta y_p]$$
$$c_q = [x_q, y_q], f_q = [\Delta x_q, \Delta_q] \quad (8)$$

Generally, the distance d between the two windows may be computed as:

$$d(p, q)^2 = ((x_p + \Delta x) - (x_q + \Delta x_q))^2 + ((y_p + \Delta y_p) - (y_q + \Delta y_q))^2 \quad (9)$$

However, the function $V_{pq}$ could also be different for rows and columns.

For example, in some embodiments, if the windows p and q belong to the same row, the following assumption is made for the relationship between the windows p and q:

$$|x_p - x_q| = 4 \quad (10)$$

$$y_p - y_q = 0 \quad (11)$$

e.g., the windows p and q should have a horizontal distance of four pixels, e.g., one symbol width, and belong to the same row, e.g., the same vertical position in the image IMG.

In this case the distance would be:

$$d(p,q)^2 = 16 + 2 \cdot (x_p - x_q)(\Delta x_p - \Delta x_q) + (\Delta x_p \Delta x_q)^2 + (\Delta y_p - \Delta y_q)^2 \quad (12)$$

Conversely, if the windows p and q belong to the same column, the following assumption is made for the relationship between the windows p and q:

$$x_p - x_q = 0 \quad (13)$$

$$|y_p - y_q| = 4 \quad (14)$$

e.g., the windows should have a vertical distance of four pixels, e.g., one symbol height, and belong to the same column, e.g., the same horizontal position in the image IMG.

In this case the distance would be:

$$d(p,q)^2 = 16 + 2\cdot(y_p - y_q)(\Delta y_p - \Delta y_q) + (\Delta x_p - \Delta x_q)^2 + (\Delta y_p - \Delta y_q)^2 \quad (15)$$

Accordingly, in this embodiment the distance should be four pixels either in the horizontal direction or vertical direction, e.g., the distance term $d(p, q)^2$ would be 16 in the best case.

Accordingly, the cost function could try to minimize the remaining distance, e.g.:

$$V_{pq}(f_p, f_q) = \begin{cases} 2\cdot(x_p - x_q)(\Delta x_p - \Delta x_q) + (\Delta x_p - \Delta x_q)^2 + (\Delta y_p - \Delta y_q)^2 & \text{if } y_p = y_q \\ 2\cdot(y_p - y_q)(\Delta y_p - \Delta y_q) + (\Delta x_p - \Delta x_q)^2 + (\Delta y_p - \Delta y_q)^2 & \text{if } x_p = x_q \end{cases} \quad (16)$$

Generally, any method may be used to solve the problem to optimize, e.g., minimize, equations (3) or (7).

However, due to the fact, that a large amount of combinations exists, e.g., 16 possible combinations for each shift $f_p$ or $f_q$ for all classification windows, usually, such problems are solved through iterative methods, such as the "*Graph Cut*" method disclosed in Boykov, O. V., "*Fast approximate energy minimization via graph cuts*", Pattern Analysis and Machine Intelligence, 1222-1239, 2011, or the "Belief propagation" disclosed in Pearl J., "*Probabilistic Reasoning in Intelligent Systems; Networks of Plausible Interference*", Morgan Kaufmann, 1988.

For example, one possible implementation of the belief propagation method is disclosed in Felzenszwalb P. F., "*Efficient belief propagation for early vision*", International Journal of Computer Vision, 41-54, 2006.

Once the positions of the classification windows have been determined, during the second operation is decided if a classification windows comprise a black or white symbol.

Generally, any classification method may be used for this purpose.

For example, the classification may be based only on the value of the pixel in the center of the classification window, or the average value of all pixels may be compared with a threshold. Moreover, the average value may also take into account the distance of the pixel from the center of classification windows, e.g., in order to give more importance to pixels near the center.

Conversely, in some embodiments a machine learning approach has been used.

Figure 8:
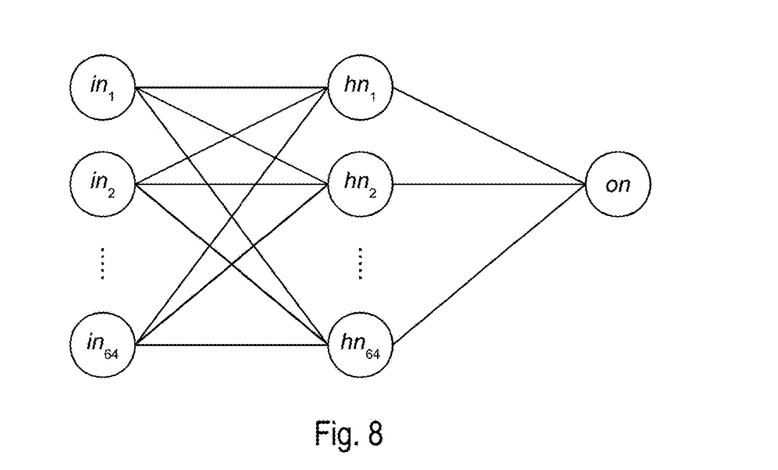

For example, in some embodiments an artificial neural network (ANN) is used for the classification of the classification window.

FIG. 8 shows in this respect a possible embodiment of the neural network.

In the embodiment considered, the neural network does not take into account merely the basic classification window having one symbol width and height, but the neural network receives as input the pixels of an enlarged area centered on the center of the initial classification window, such as an area having the double width and double height, e.g., 8×8 pixels for the above symbols.

Accordingly, in the embodiment considered, the ANN receives as input 64 pixel values, e.g., the neural network has an input layer comprising 64 input nodes $in_1 \ldots in_{64}$.

In some embodiments, the ANN comprises a given number of hidden layers with a respective number of hidden nodes. For example, in some embodiments, a single hidden layer with 64 nodes $hn_1 \ldots hn_{64}$ is used.

In some embodiments the ANN comprises at least one output node on. For example, in the embodiment considered, the ANN has only one output on that provides directly the classification result, e.g., a value indicating the probability that the decoded symbol is a black square or a white square.

Conversely, the ANN could also have at least two outputs, which provide the probability for a black square and a white square, respectively.

Accordingly, based on the above values a given window can be classified as a black square or white square. Moreover, in case the above values do not permit to take a meaningful decision, e.g., because the values indicate that a clear decision is not possible, the respective window could also be identified as "unclassified". Finally, instead of taking a hard decision on the classification of the windows, the following step concerning the matching operation could also operate with soft information, e.g., with the symbol probabilities.

Generally, the described decoding operation may also be used with patterns PAT which comprise other symbol sequences and not necessarily the De Bruijni sequences described in the foregoing. In fact, the described decoding operation may be used to place and correctly position an array of classification windows on an image IMG containing an array of symbols.

Figure 3:
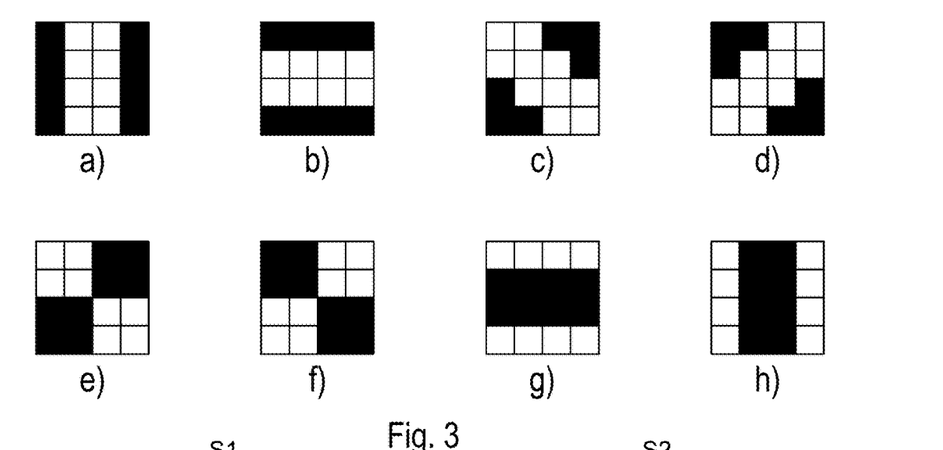
FIGS. 3 to 5 shows details of the generation of a pattern in accordance with the present disclosure.

Moreover, the described decoding operation may also be used in case the pattern PAT comprises different symbols (e.g., the symbols shown in FIGS. 3a to 3h) or even more than two symbols (e.g., symbols having different grayscale values) by adapting the cost function $D_p(f_p)$ and the classification function, e.g., the ANN.

Matching Operation

As mentioned in the foregoing, the previous decoding operation provides an array of classified symbols, e.g., a decoded pattern DPAT. For example, in some embodiments, this array is a bit map indicating whether a given position corresponds to a black or white symbol.

Accordingly, in some embodiments, the decoded array DPAT has the same dimension as the array of symbols, which were used to create the pattern PAT, e.g., an array of 160×120 symbols.

However, generally, the decoding operation could also provide additional information, such as:

a value indicating the reliability of the respective decoding operation, e.g., the probability of the classification; and/or a value indicating the exact position of the classification windows in the image IMG, e.g., the shift vector $f_p$.

Basically, the scope of the matching operation is to find the sub-sequences of symbols of the original pattern PAT in the decoded array DPAT.

For example, in some embodiments, the original pattern PAT and the decoded pattern DPAT are represented by bit maps, wherein each value ("0" or "1") indicates whether a given position corresponds to a black or white symbol, e.g., a square or generally a rectangle with a given dimension.

In this case, the hamming distance can be used to determine the similarity between two blocks of symbols.

For example, for the previous example of sub-sequences containing nine symbols, also these blocks may comprise a width of 9 symbols. Conversely, the height may be selected in order to render the matching operation more robust. In fact, as mentioned in the foregoing, the sub-sequences may be repeated in the pattern. Accordingly, matching a single sequence may be insufficient. Conversely, in some embodiments, the symbol rows in the pattern PAT intrinsically have an offset or a variable offset may be added. Accordingly, by evaluating several rows, usually only a single correspondence exists for a given block. For example, experiments conducted by the instant applicant show, that seven symbol rows are suitable. Accordingly, in an embodiment, the blocks have a dimension of 9×7 symbols.

Specifically, the hamming distance calculates the number of symbols, which are different for two blocks, e.g., a block in the pattern PAT and a respective block in the decoded pattern DPAT (or vice versa). Accordingly, the hamming distance determines the number of symbols which are different between the block. Thus, by calculating the hamming distance for all blocks in the decoded pattern DPAT, the block may be determined which best corresponds to a given block in the original patter PAT (or vice versa the block in the pattern PAT that corresponds to a given block in the decoded pattern DPAT).

Generally, instead of using the hamming distance, also other methods may be used to determine the similarity between two blocks, such as a Sum of Absolute Differences (SAD) or a Mean Square Error (MSE).

Finally, once the best matching blocks have been determined, e.g., the blocks with the lower hamming distance, a disparity value may be assigned to the block of symbols as a function of the distance between the block in the original pattern PAT and the respective block in the decoded pattern DPAT.

For example, in one embodiment, this operation is repeated for all decoded symbols in the decoded pattern DPAT by:
- selecting a block of decoded symbols centered on the current symbol, e.g., a 9×7 symbol block;
- determining a block of symbols in the original pattern PAT that matches best the block of decoded symbols;
- determining the distance between the block of decoded symbols and the matching block of symbols in the original pattern PAT;
- assign a disparity value to the current pixel as a function of the distance between the two blocks.

Generally, a substantially similar method may be used to determine the disparity value for a symbol in the original pattern PAT and finding the matching block in the decoded pattern DPAT.

Moreover, the matching operation may further be improved by taking into account the information indicating the reliability of the decoding operation.

For example, in an embodiment, the reliability information may be used to select between blocks which have a similar matching result, e.g., a similar hamming distance.

Instead, the matching operation could also take into account directly the symbol probabilities. For example, in an embodiment, the probability that a decoded symbol is black or white may be used as reference value for the calculation of a SAD or MSE. For example, in case the probability that a symbol is white would be 0.9 and the corresponding symbol in the pattern PAT would be white (with a binary value 1), a SAD based comparison would add 0.1 to the previous result. Similarly, in case the probability that a symbol is black would be 0.9, e.g., the probability that the symbol is a white would be 0.1, and the corresponding symbol in the pattern PAT would be black (with a binary value 0), a SAD based comparison would add 0.1 to the previous result.

Generally, the matching operation could also determine a plurality of candidate disparity values for each symbol, e.g., for a given number of best matching blocks or the blocks which satisfy a given matching result (e.g., with a given maximum hamming distance), and a further filtering operation may be used to select the disparity values taking into account also the candidate disparity values of the surrounding symbols.

The inventors have observed that the matching operation may also be improved by removing shadows prior to performing the matching operation.

For example, in some embodiments, shadows are detected in blocks of symbols, such as 7×7 symbol bocks.

For example, in some embodiments, shadows are detected by determining the number of black symbols in this block. In fact, by using De Brujin sequences, the number of black and white symbols should be more or less the same, while black symbols prevail in shadow regions. For example, in some embodiments, a block of symbols in the decoded pattern DPAT is marked as shadow region when the number of black symbols in a given block is greater than 75%.

Again this operation may be performed for all symbols in the decoded pattern DPAT, e.g., by selecting a respective block of symbols surrounding each symbol and determining the number of black pixels in the respective block.

In this case, the decoding operation is only performed for the symbols, which do not belong to shadow regions, e.g., the symbols belonging to shadow regions are not considered in the matching operation, e.g., the hamming distance is calculated only for the symbols, which are not marked. Evidently, this may introduce some uncertainty at the borders of shadow zones. However, by using larger matching blocks or by performing a filtering of multiple disparity values, this uncertainty may be reduced.

Moreover, as mentioned in the foregoing, the step 2012 may also take into account information indicating the exact position of the classification windows in the image IMG, e.g., the shift vector $f_p$. In fact, the decoded pattern DPAT per se has only symbol resolution. Conversely, the shift vector $f_p$ indicates more precisely the position of the classification windows and thus the decoded symbol. Thus, when calculating the disparity value, this shift may be taken into account.

Filtering

The final disparity map may then by filtered at the step 2014.

For example, in some embodiments, a filter is used to determine disparity values, which strongly differ from surrounding disparity values. In particular this filter is useful if the previous matching operation did not take into account plural candidates of disparity values.

In some embodiments, the filter may also determine abnormal disparity values. For example, in an embodiment the filter determines similar to a histogram, the number of classification windows (or symbols in the decoded pattern DPAT) which has associated similar disparity values. For example, the filter may also group together symbols with similar disparity values, e.g., symbols wherein the disparity value differs at most 4.

Next the filter may disregard all disparity values, and thus the respective symbols, for which the respective number of disparity values is below a given threshold. For example, for the above pattern resolution (160×120 symbols) and groups of disparity values with a disparity of +/−4, the threshold may be selected e.g., between 20 and 200, e.g., 100.

In some embodiments, the filtering operation may also comprise a depth filling operation. Generally, not all symbols may be matched, e.g., due to occlusions, shadows or errors during the decoding or matching phase. Accordingly, the respective position may be filled.

For example, in some embodiments, the previous mentioned shadow regions may be filled with a depth value corresponding to the background, e.g., a low depth value.

Conversely, the other unmatched regions, which thus usually correspond to symbols with decoding or matching errors, may be filled with disparity values obtained from an interpolation operation, e.g., by taking into account the disparity values associated with the surrounding symbols.

For example, in some embodiments, a bilinear interpolation is used to assign a disparity value to the unmatched symbol, which remain after the above mentioned shadow region filling operation.

For example, in some embodiments, unmatched regions are determined and for each symbol position in the region is determined the first valid values in horizontal and vertical direction $v_u$ (up), $v_d$ (down), $v_l$ (left), and $v_r$ (right). Next the disparity value to be assigned to the unmatched symbol may be determined as follows:

$$v = \frac{(v_l \cdot \Delta l + v_r \cdot \Delta r) \cdot l_h}{2 \cdot l_h \cdot l_v} + \frac{(v_u \cdot \Delta u + v_d \cdot \Delta d) \cdot l_v}{2 \cdot l_h \cdot l_v} \quad (17)$$

where:
$l_h$ and $l_v$ are the number of pixels in horizontal and vertical direction, respectively, in the unmatched region; and
$\Delta l$, $\Delta r$, $\Delta u$, and $\Delta d$ are the number of pixel till the next valid pixel in left, right, up and down direction.

Disparity to Depth Conversion

At the end, the disparity values may also be used to calculate the actual distance from the camera.

For example, the following equation may be used for this purpose:

$$z = \frac{f_c f_p}{f_c x_p - f_p x_c}\left(x_p^c + x_p - x_c + \frac{z_p^c x_p}{f_p}\right) \quad (18)$$

where:
$f_c$ and $f_p$ are the camera and projector focal length
$x_c$ and $x_p$ are the positions of two corresponding points in the camera and the projector;
$x_p^c$ is the baseline, e.g., the distance from the center of the camera and the projector center; and
$z_p^c$ is the depth difference between the center of the camera and the projector.

Specifically, the values $x_c$ and $x_p$ may be extracted from the matching phase 2012 and the other parameters may be computed during the calibration phase.

Figure 9A:
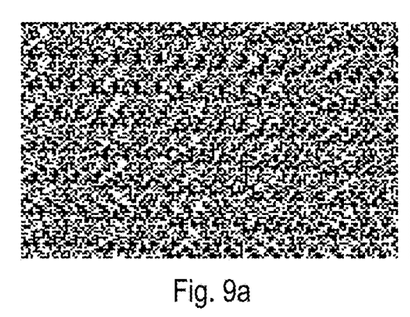
Figure 9B:
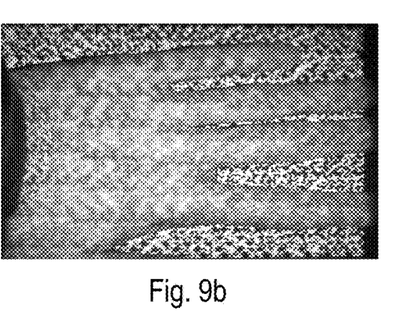
Figure 9C:
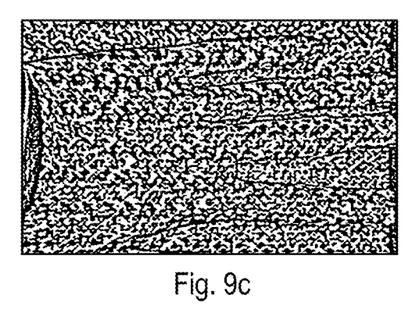

FIGS. 9a to 9f show examples of the results of the various steps described in the foregoing. Specifically FIG. 9a shows the original pattern PAT to be projected in step 2004 by the projector 10 and FIG. 9b shows a respective image IMG acquired via the camera 20 in the step 2006.

Figure 9D:
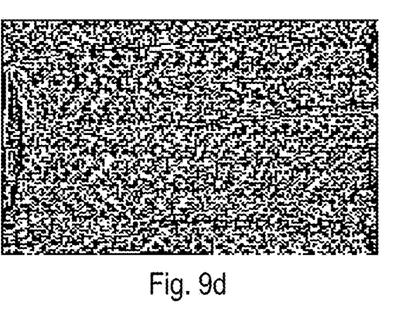
Figure 9E:
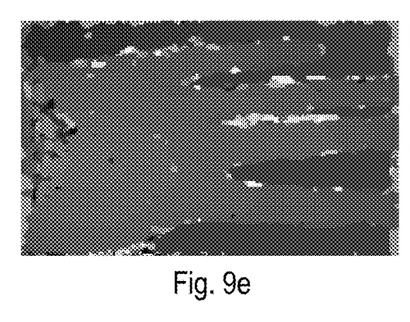

The image IMG may then be filtered in the step 2008 in order to generate a binary image (see FIG. 9c) and the symbols are decoded in the step 2010. Specifically, FIG. 9d shows a representation of the decoded pattern DPAT where the classification windows have be filled either with a black or a white symbol.

In step 2012, the symbols in the decoded pattern DPAT are then matched with the symbols in the original pattern PAT and the depth map DM is generated (see FIG. 9e) by calculating the disparity values determined during the matching operation.

Figure 9F:
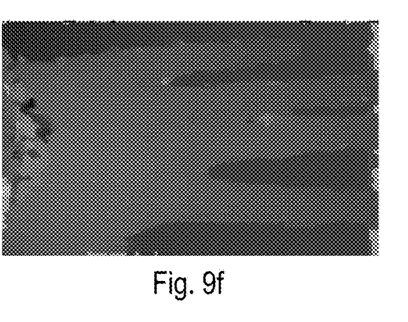

Finally, the depth map DM may be filtered in order to determine abnormal disparity values and to fill unmatched areas (FIG. 9f).

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating a pattern of symbols to project as a projected image, said pattern including an array of symbols having a number of symbol columns and a number of symbol rows;
obtaining an image from a camera;
decoding said obtained image, generating a decoded pattern of symbols comprising an array having said number of symbol columns and number of symbol rows, the decoding including:
defining an array of classification windows of said obtained image, wherein said array of classification windows has said number of symbol columns and number of symbol rows;
determining a displacement of each classification window by optimizing a cost function; and
generating said decoded pattern by determining a respective symbol for each classification window; and
generating a depth map as a function of said pattern of symbols to project and said decoded pattern, wherein said determining a respective symbol for each classification window comprises classifying the symbol in each classification window using an artificial neural network.

2. The method of claim 1 wherein said array of symbols of the pattern of symbols to project is filled with at least one De Bruijn sequence of unique sub-sequences of symbols with a sub-sequence length.

3. The method of claim 2 wherein said array of symbols of the pattern of symbols to project is filled with at least one De Bruijn sequence of unique sub-sequences of symbols with a sub-sequence length by repeating the same De Bruijn sequence and adding a variable offset to said Bruijn sequence after one or more threshold numbers of symbols.

4. The method of claim 1 wherein said array of symbols of the pattern of symbols to project is filled based on an alphabet comprising only two different symbols.

5. The method of claim 1, wherein said array of symbols of the pattern of symbols to project is filled based on an alphabet comprising symbols with the same dimension, pixels of a symbol of the alphabet have a same grayscale value, and each symbol of said alphabet has a respective different pixel greyscale value.

6. The method of claim 5 wherein said alphabet comprises only a first and a second symbol, the pixels of said first symbol are all black, and the pixels of said second symbol are all white.

7. The method of claim 5 wherein said cost function is a global cost function which takes into account:
a first cost based on whether displaced classification windows contain valid symbols; and
a second cost based on whether displaced classification windows have valid distances with respect to surrounding classification windows.

8. The method of claim 1, comprising:
subjecting said image obtained from said camera to a binarization filter in order to generate a binarized version of said obtained image and performing said decoding on said binarized version of said obtained image.

9. The method of claim 1 wherein said cost function takes into account at least one of:
a first cost based on whether displaced classification windows contain valid symbols; and
a second cost based on whether displaced classification windows have valid distances with respect to surrounding classification windows.

10. The method of claim 1 wherein said generating said depth map as a function of said pattern and said decoded pattern comprises performing a matching operation, the matching operation including at least one of:
determining for each symbol position in said decoded pattern at least one matching symbol position in said pattern of symbols to project; and
determining for each symbol position in said pattern of symbols to project at least one matching symbol position in said decoded pattern.

11. The method of claim 10 wherein said generating said depth map as a function of said pattern of symbols to project and said decoded pattern comprises determining for each symbol position a distance between said symbol position and the respective at least one matching symbol position.

12. A device, comprising:
one or more memories; and
image processing circuitry configured to:
generate, based on a received image, a decoded pattern of symbols comprising an array having a number of symbol columns and number of symbol rows, the generating including:
defining an array of classification windows of said image, said array of classification windows having said number of symbol columns and number of symbol rows;
determining a displacement of each classification window by optimizing a cost function; and
determining a respective symbol for each classification window; and
generate a depth map as a function of a projected image of a pattern of symbols and said decoded pattern, the projected image of the pattern of symbols including an array of symbols having said number of symbol columns and said number of symbol rows, wherein the image processing circuitry comprises an artificial neural network configured to determine a respective symbol for each classification window.

13. The device of claim 12 wherein said array of symbols of the projected image of the pattern of symbols includes at least one De Bruijn sequence of unique sub-sequences of symbols with a sub-sequence length.

14. The device of claim 13 wherein said array of symbols of the projected image of the pattern of symbols includes a repeating of the De Bruijn sequence with a variable offset added to said Bruijn sequence after one or more threshold numbers of symbols.

15. The device of claim 12 wherein said array of symbols of the projected image of the pattern of symbols is based on an alphabet comprising only two different symbols.

16. The device of claim 12 wherein said array of symbols of the projected image of the pattern of symbols is based on an alphabet comprising symbols with a same dimension, pixels of a symbol of the alphabet have a same grayscale value, and each symbol of said alphabet has a respective different pixel greyscale value.

17. The device of claim 16 wherein said alphabet comprises only a first and a second symbol, the pixels of said first symbol are all black, and the pixels of said second symbol are all white.

18. The device of claim 12, comprising:
a binarization filter configured to filter the received image wherein the decoded pattern of symbols is generated based on the filtered image.

19. The device of claim 12 wherein said cost function takes into at least one of:
a first cost based on whether displaced classification windows contain valid symbols; and
a second cost based on whether displaced classification windows have valid distances with respect to surrounding classification windows.

20. The device of claim 12 wherein the image processing circuitry is configured to generate the depth map by,
determining for each symbol position in said decoded pattern at least one matching symbol position in said pattern of symbols of the projected image; and
determining for each symbol position in said pattern of symbols of the projected image at least one matching symbol position in said decoded pattern.

21. The device of claim 20 wherein the image processing circuitry is configured to generate the depth map by determining for each symbol position a distance between said symbol position and the respective at least one matching symbol position.

22. The device of claim 12 wherein said cost function is a global cost function which takes into account:
   a first cost based on whether displaced classification windows contain valid symbols; and
   a second cost based on whether displaced classification windows have valid distances with respect to surrounding classification windows.

23. A non-transitory computer-readable medium having contents which configure a digital image processor to perform a method, the method comprising:
   generating, based on a received image, a decoded pattern of symbols comprising an array having a number of symbol columns and number of symbol rows, the generating including:
      defining an array of classification windows of said image, said array of classification windows having said number of symbol columns and number of symbol rows;
      determining a displacement of each classification window based on a cost function; and
      determining a respective symbol for each classification window, wherein said determining a respective symbol for each classification window comprises classifying the symbol in each classification window using an artificial neural network; and
   generating a depth map as a function of a projected pattern of symbols and said decoded pattern, the projected pattern of symbols including an array of symbols having said number of symbol columns and said number of symbol rows.

24. The medium of claim 23 wherein the method comprises:
   projecting the projected pattern of symbols.

25. The medium of claim 24 wherein said array of symbols of the projected pattern is based on an alphabet comprising symbols with a same dimension, pixels of a symbol of the alphabet have a same grayscale value, and each symbol of said alphabet has a respective different pixel greyscale value.

26. The medium of claim 25 wherein said alphabet comprises only a first and a second symbol, the pixels of said first symbol are all black, and the pixels of said second symbol are all white.

27. A system, comprising:
   a projector to project an image of a pattern of symbols, said pattern including an array of symbols having a number of symbol columns and a number of symbol rows;
   an image sensor;
   image processing circuitry configured to:
      obtain an image from the image sensor;
      decode said obtained image, generating a decoded pattern of symbols comprising an array having said number of symbol columns and number of symbol rows, the decoding including:
         defining an array of classification windows of said obtained image, wherein said array of classification windows has said number of symbol columns and number of symbol rows;
         determining a displacement of each classification window by optimizing a function associated with the displacement; and
         generating said decoded pattern by determining a respective symbol for each classification window; and
      generate a depth map as a function of said pattern of symbols of the image to project and said decoded pattern, wherein the image processing circuitry comprises an artificial neural network configured to determine a respective symbol for each classification window.

28. The system of claim 27 wherein the image processing circuitry comprises a binarization filter configured to filter the obtained image and is configured to generate the decoded pattern of symbols based on the filtered image.

29. The system of claim 27 wherein said function associated with the displacement is a global cost function which takes into account:
   a first cost based on whether displaced classification windows contain valid symbols; and
   a second cost based on whether displaced classification windows have valid distances with respect to surrounding classification windows.

30. The system of claim 27 wherein said array of symbols of the pattern of symbols of the image to project is filled based on an alphabet comprising symbols with a same dimension, pixels of a symbol of the alphabet have a same grayscale value, and each symbol of said alphabet has a respective different pixel greyscale value.

\* \* \* \* \*